Oct. 27, 1942.  W. I. JONES  2,300,292
SNAP FASTENER MEMBER
Filed April 30, 1940
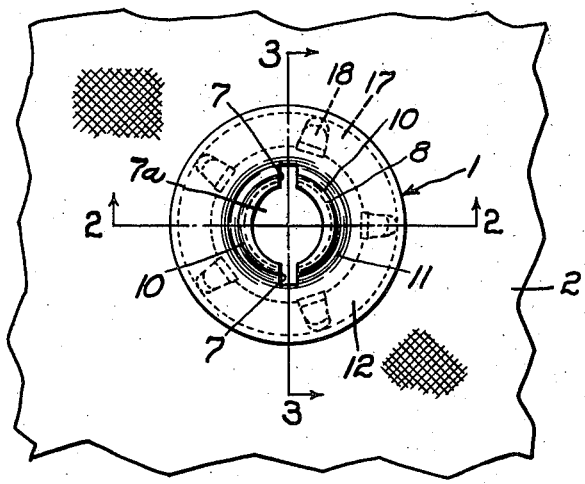
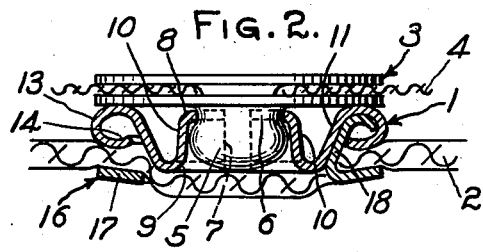
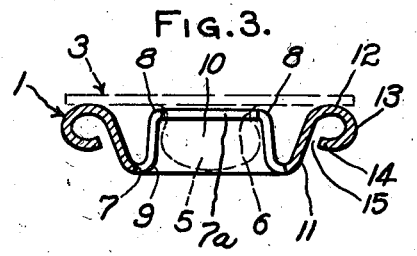
INVENTOR:
WALTER I. JONES,
BY John Jodd ATT'Y.

Patented Oct. 27, 1942

2,300,292

UNITED STATES PATENT OFFICE 2,300,292

SNAP FASTENER MEMBER

Walter I. Jones, Belmont, Mass., assignor to United-Carr Fastener Corporation, Cambridge, Mass., a corporation of Massachusetts Application April 30, 1940, Serial No. 332,467

1 Claim. (Cl. 24—216)

This invention relates to stud and socket fastener assemblies and has for its object to provide improvements in socket members of the so-called laundryproof type which have resilient portions adapted to engage the neck of a cooperating stud part.

The present invention is directed to an improvement over socket members of the type shown by United States Patents Nos. 2,106,728 and 2,131,347 issued to Fenton.

The socket members shown by the above-mentioned patents provide cylindrical barrels having four slots extending from the forward ends toward the rear ends dividing the respective barrels into four resilient portions adapted to receive the head of a stud member and resiliently grip a constricted neck thereof. This four-segment construction presents inherent weaknesses, as hereinafter set out. Thus it has been found in practice that these resilient portions have a tendency to set slightly when the stud is engaged therewith with the result that they have a relatively hard action upon first engagement of the stud therewith and an easier action thereafter. Also, it has been found that after repeated engagement and disengagement of the parts, the tendency of the four resilient portions to set causes the action of the socket to be so easy that it is unsatisfactory for many uses.

A further disadvantage of the sockets of the above-mentioned patents results from the fact that the barrel is so weakened by its division into four parts that the resilient portions are not strong enough to resist an unnatural degree of force exerted thereon by movement of the stud in a lateral direction. As a result, one or more of the resilient portions may be deformed sufficiently by such lateral stress to render the socket inoperative.

Still another disadvantage of the four-portion barrel results from the tendency of one or more of the resilient portions to be collapsed or deformed by pressure of the stud on the forward ends thereof when the stud is incorrectly aligned with the barrel opening during attempted engagement thereof with the socket.

This present invention relates to a socket member of improved construction over those disclosed by the above-mentioned patents and is directed to a socket member which, instead of providing a cylindrical barrel divided into four resilient portions, has, in its preferred form, a barrel divided by two slots into two resilient portions and providing an oval stud-receiving opening. Thus by providing two resilient portions instead of four, each of the portions has sufficient strength to resist setting even after repeated engagement and disengagement of the parts. As a consequence, a constant action can be maintained over a long period of use and the first snap does not have to be a hard one.

Furthermore, the yieldable segments provided by the two-slot construction are sufficiently stronger, as a result of their substantially greater length, to resist lateral distortion when subjected to lateral pressure equivalent to that which is capable of distorting the resilient portions of the known sockets. Also, the additional strength of the double segment construction serves to greatly diminish chances of collapse when subjected to pressure in a direction axially of the barrel as a result of improper alignment of the stud and barrel during attempted interengagement. The oval shape of the barrel opening assures an easy fastening action for reasons hereinbelow set out.

Referring to the drawing, in which I have illustrated a preferred embodiment of my invention:

Fig. 1 is a front view of an installation showing one of my improved socket members carried by a supporting strip;

Fig. 2 is a sectional view taken along the line 2—2 of Fig. 1 and showing a cooperating stud member in fastener engagement therewith; and Fig. 3 is a section of the socket only taken along the line 3—3 of Fig. 1, a cooperating stud member being indicated in broken lines.

Referring to the drawing, I have shown a stud and scoket installation comprising a socket member 1 adapted to be carried by a strip of material 2 and a stud member 3 carried by a strip 4. The stud and socket members are preferably of the so-called laundryproof type in that they are intended for use on article of apparel such as underwear, shirts and the like which are laundered regularly and both parts of the fastener are constructed to stand up under modern washing and ironing methods. The stud member 3, which is secured to the strip 4 in any suitable way, provides a stud portion having a head 5 and a constricted neck portion 6. The socket member 1 has a barrel portion which is open at both ends to receive the stud head 5. The barrel has a pair of slots 7—7 which extend from the forward end 8 of the barrel toward its rear end 9 dividing the barrel into a pair of similar oppositely disposed resilient portions 10—10. The end 8 of the barrel has an elliptical aperture 7ª, the purpose of which will be explained more fully hereinafter. It will be noticed that the slots 7 are in the same line and lie substantially on the major axis of the barrel. An annular flange portion 11 extends reversely from the rear end 9 of the barrel toward its forward end 8 and outwardly in a gradually sloping formation until the forward surface 12 of the flange 11 is positioned forwardly of a horizontal plane, viewing Fig. 3, through the forward end 8 of the barrel. A U-shaped annular retainer ring 13 extends reversely from the forward surface 12 of the flange 11 and has its free edge 14 spaced from the sloping surface of the flange 11 so as to leave an annular slot 15 (Fig. 3). The socket member 1 is secured to the supporting strip 2 through means of an attaching member 16 having a base 17, which may be in the form of a ring, and interval prong-shaped attaching portions 18 extending outwardly from the inner edge of the ring. In assembly of the parts, the prongs 18 are projected through the strip 2 and against the sloping flange 11 of the socket member by which they are turned through the annular slot 15 into the retainer ring 13. Thus the prongs 18 are securely engaged with the socket member 1 so that the strip 2 is clamped between the ring 17 and the socket member.

As a result of the elliptical-shaped stud-receiving aperture 7a (Fig. 1), the resilient portions 10—10 grip the neck 6 of the stud at points on their respective lengths midway their ends. This effects a smoother action than would be the case if the aperture were to be made cylindrical due to the fact that if the aperture were cylindrical, the yieldable portions are so stiff that the wall portions at the aperture adjacent to the slots 7—7 would have to move too great a distance to permit passage of the head of the stud thereby preventing a smooth and easy action. The particular construction of the resilient portions of the present socket, wherein they have sufficient length to form arcs of substantially more than 90°, effects a very strong barrel capable of resisting distortion due to unnatural forces to which a fastener for wearing apparel is constantly subjected. Thus the continuous semi-elliptical length of the portions 10—10 gives them added strength to maintain their shape even though subjected to lateral pressure by lateral movement of the stud member when the parts are engaged. Also, their sturdier construction aids to prevent axial collapse due to misalignment of the stud with the stud-receiving opening of the barrel in attempted engagement of the parts.

The present socket member presents simpler manufacturing problems than previous sockets mentioned above and, at the same time, effects improved results over the above-mentioned sockets which render it commercially more desirable.

The snap fastener action feels more lively and springy due to the sturdy construction. The socket is stronger, the tools for making it are simpler and can be maintained more cheaply, and the socket can be made of harder metal and yet have a good snap action.

Although I have illustrated and described a preferred embodiment of my invention, I do not wish to be limited thereby because the scope of my invention is best defined by the following claim.

I claim:

In a laundry-proof snap fastener installation of the type including a socket member adapted for snap fastener engagement with a circular stud member, which socket member is attachable to a sheet of supporting material by means of a pronged attaching ring insertable through the material into engagement with the socket; said socket member comprising a single piece of sheet metal shaped to provide a single thickness metal wall inturned along its free inner end and presenting a substantially elliptical stud-receiving bore for the reception of said circular stud, said inturned end and wall being formed with relatively wide slots as compared to the thickness of the metal of the wall, along the major axis of said elliptical bore, dividing said bore into a pair of opposed semi-elliptical stud-engaging portions, a pair of semi-circular breasts of arcuate cross section disposed along the outer edge of said wall, a retaining ring of U-shaped cross section extending from the outer margin of the breast and disposed radially beyond the socket and adapted to receive and clench the prongs of the attaching ring passed through the sheet of supporting material, the semi-elliptical wall portions of said socket being continuous throughout their length presenting relatively stiff stud-engaging portions for engagement with the circular stud throughout limited regions thereof intermediate the ends thereof affording a highly springy snap fastener action between the stud and elliptical socket while providing stud-engaging portions of sturdy construction against axial collapse thereof.

WALTER I. JONES.